United States Patent
Liu et al.

(10) Patent No.: US 11,263,757 B2
(45) Date of Patent: Mar. 1, 2022

(54) IMAGE IDENTIFYING METHOD AND RELATED MONITORING CAMERA AND MONITORING CAMERA SYSTEM

(71) Applicant: VIVOTEK INC., New Taipei (TW)

(72) Inventors: Cheng-Chieh Liu, New Taipei (TW); Chia-Wei Chi, New Taipei (TW); I-Lun Chen, New Taipei (TW)

(73) Assignee: VIVOTEK INC., New Taipei (TW)

(*) Notice: Subject to any disclaimer, the term of this patent is extended or adjusted under 35 U.S.C. 154(b) by 102 days.

(21) Appl. No.: 16/687,582

(22) Filed: Nov. 18, 2019

(65) Prior Publication Data

US 2020/0394803 A1    Dec. 17, 2020

(30) Foreign Application Priority Data

Jun. 17, 2019 (TW) .................. 108120888

(51) Int. Cl.
| G06T 7/00 | (2017.01) |
| G06T 7/194 | (2017.01) |
| G06T 7/11 | (2017.01) |
| G06T 7/246 | (2017.01) |

(52) U.S. Cl.
CPC ............ *G06T 7/194* (2017.01); *G06T 7/0008* (2013.01); *G06T 7/11* (2017.01); *G06T 7/248* (2017.01); *G06T 2207/20084* (2013.01)

(58) Field of Classification Search
CPC ....... G06K 9/00771; G06K 2009/3291; G06K 9/3241; G06K 9/00335; G06F 16/7837; G06F 16/786; G06T 7/254; G06T 2207/10016; G06T 2207/30232; G06T 2207/30196; G08B 13/19606; G08B 13/19613; G08B 13/19604; G08B 13/19608; G08B 13/19602; G08B 13/19617

See application file for complete search history.

(56) References Cited

U.S. PATENT DOCUMENTS

| 5,969,755 | A | * | 10/1999 | Courtney | ........... | G06K 9/00342 |
| | | | | | | 348/143 |
| 6,049,363 | A | * | 4/2000 | Courtney | ........... | G06K 9/00771 |
| | | | | | | 348/700 |
| 7,813,528 | B2 | | 10/2010 | Porikli | | |

(Continued)

FOREIGN PATENT DOCUMENTS

| CN | 103729613 A | 4/2014 |
| CN | 102063614 B | 6/2015 |

(Continued)

*Primary Examiner* — Li Liu
(74) *Attorney, Agent, or Firm* — Winston Hsu

(57) ABSTRACT

An image identifying method is applied to a monitoring camera and a monitoring camera system and used to determine whether a target object is a leaving object or a missing object. The image identifying method includes acquiring a foreground region within a monitoring image corresponding to the target object, analyzing whether the target object inside the foreground region conforms to a variant feature, and comparing the foreground region with a reference image for determining the target object belongs to the leaving object or the missing object when the foreground region does not conform to the variant feature.

20 Claims, 5 Drawing Sheets

(56) References Cited

U.S. PATENT DOCUMENTS

| | | | | |
|---|---|---|---|---|
| 8,711,217 B2* | 4/2014 | Venetianer | ............ | G08B 31/00 |
| | | | | 348/143 |
| 2002/0141637 A1* | 10/2002 | Brodsky | ................ | G06T 7/254 |
| | | | | 382/165 |
| 2008/0158361 A1* | 7/2008 | Itoh | ................. | G08B 13/19602 |
| | | | | 348/155 |
| 2009/0245571 A1* | 10/2009 | Chien | ................ | G06K 9/00771 |
| | | | | 382/103 |

FOREIGN PATENT DOCUMENTS

| | | | |
|---|---|---|---|
| CN | 106845424 A | | 6/2017 |
| CN | 109636795 A | | 4/2019 |
| TW | 201113835 | | 4/2011 |

\* cited by examiner

IMAGE IDENTIFYING METHOD AND RELATED MONITORING CAMERA AND MONITORING CAMERA SYSTEM

BACKGROUND OF THE INVENTION

1. Field of the Invention

The present invention relates to an image identifying method and a related monitoring camera and a related monitoring camera system, and more particularly, to an image identifying method of determining whether a target object is a leaving object or a missing object and a related monitoring camera and a related monitoring camera system.

2. Description of the Prior Art

A conventional monitoring camera compares a current monitoring image with a previous background image for detecting pixel variation when an object identifying process is executed. If the pixel variation in the images is small, the object captured by the images does not have an obvious change, which means a monitoring region of the monitoring camera is in a normal state. If the pixel variation in the images is large, the object stayed in the monitoring region is abnormal, but the conventional monitoring camera cannot identify what kind of changes happened to the object. When the object is made by soft material, such as a flag, the monitoring camera can detect deformation of the flag due to wind force; when the object is made by rigid material, the monitoring camera can detect a movement of the object due to accident impact; when the object is in an outdoor place, the monitoring camera can detect intensity variation of the object influenced by the weather. The user only focuses whether the object is delivered or stolen, and does not care the foresaid conditions about the deformation, the movement or the intensity variation of the object. Therefore, the conventional monitoring camera wastes computation time to execute the object identifying process, but cannot provide accurate identifying result because of the foresaid conditions.

SUMMARY OF THE INVENTION

The present invention provides an image identifying method of determining whether a target object is a leaving object or a missing object and a related monitoring camera and a related monitoring camera system for solving above drawbacks.

According to the claimed invention, an image identifying method of determining whether a target object is a leaving object or a missing object includes acquiring a foreground region corresponding to the target object within a monitoring image, analyzing whether the target object inside the foreground region conforms to a variant feature, and comparing the foreground region with a reference image to determine whether the target object inside the foreground region belongs to the leaving object or the missing object when the foreground region does not conform to the variant feature.

According to the claimed invention, a monitoring camera includes an image receiver and an operation processor. The image receiver is adapted to receive a monitoring image. The operation processor is electrically connected to the image receiver. The operation processor is adapted to acquire a foreground region corresponding to the target object within a monitoring image, analyze whether the target object inside the foreground region conforms to a variant feature, and compare the foreground region with a reference image to determine whether the target object inside the foreground region belongs to the leaving object or the missing object when the foreground region does not conform to the variant feature.

According to the claimed invention, a monitoring camera system includes at least one monitoring camera and an operational processing device. The monitoring camera is adapted to receive a monitoring image. The operational processing device is connected to the monitoring camera in a wire manner or a wireless manner. The operational processing device is adapted to acquire a foreground region corresponding to the target object within a monitoring image, analyze whether the target object inside the foreground region conforms to a variant feature, and compare the foreground region with a reference image to determine whether the target object inside the foreground region belongs to the leaving object or the missing object when the foreground region does not conform to the variant feature.

The image identifying method and the related monitoring camera and the monitoring camera system of the present invention can track and record the passerby's path, and firstably obviate conditions of generating error alert due to the intensity variation, the movement or the deformation of the target object when no person approaches. Generally, the condition about the intensity variation can be analyzed and filtered before judgments about the movement and the deformation, which depends on the actual demand. After obviation of the error alert, the image identifying method can determine whether the target object belongs to the leaving object or the missing object, and send out a warning message related to determination about the leaving object or the missing object. For example, the monitoring camera or the monitoring camera system may be installed on an outdoor hallway, and the image identifying system can immediately identify a state of merchandise when the merchandise is delivered or stolen, and send the message to remind the user of the merchandise's condition accordingly. Thus, the present invention can effectively decrease the amount of data and computation in the image identifying process by excluding the object formed by the variant feature, so as to identify the target object belongs to the leaving object or the missing object rapidly and accurately.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
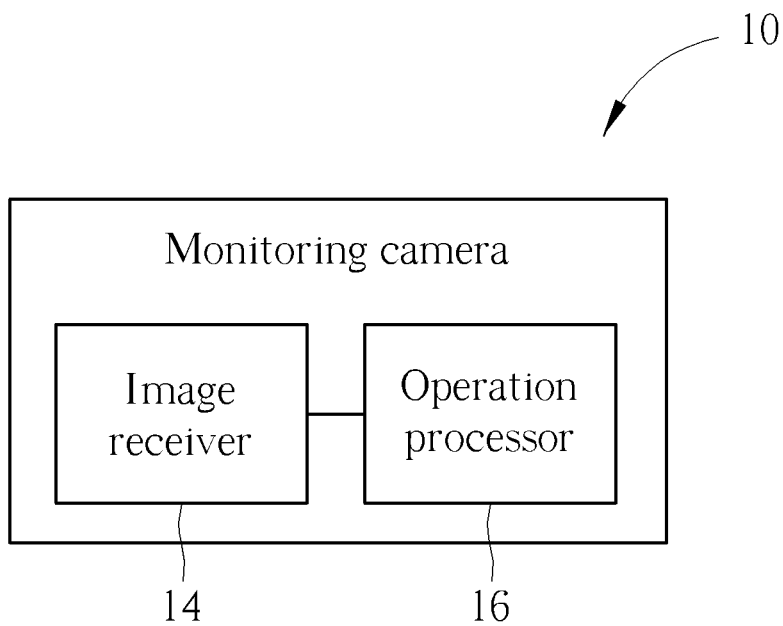
FIG. 1 is a functional block diagram of a monitoring camera according to an embodiment of the present invention.
Figure 2:
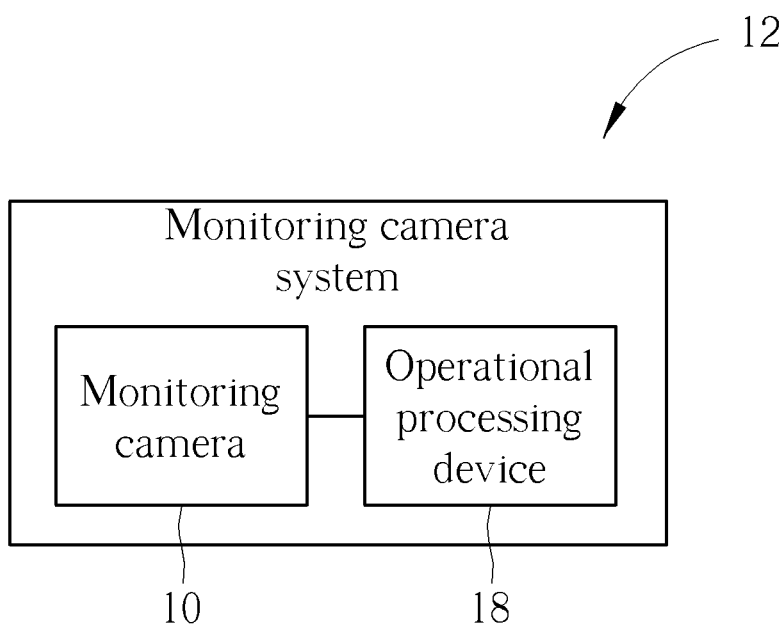
FIG. 2 is a functional block diagram of a monitoring camera system according to the embodiment of the present invention.

Please refer to FIG. 1 and FIG. 2. FIG. 1 is a functional block diagram of a monitoring camera 10 according to an embodiment of the present invention. FIG. 2 is a functional block diagram of a monitoring camera system 12 according to the embodiment of the present invention. The monitoring camera 10 can include an image receiver 14 and an operation processor 16 electrically connected to each other. The image receiver 14 is used to capture or receive a monitoring image. The operation processor 16 can analyze the monitoring image to execute an image identifying method, for determining whether a leaving object or a missing object is within the monitoring image. Moreover, the monitoring camera 10 can be matched with an operational processing device 18 to establish the monitoring camera system 12, and the operational processing device 18 can be defined as an independent controller. An amount of the monitoring camera 10 can be one or more. The monitoring camera 10 may not execute the image identifying method, but transmits the monitoring image to the operational processing device 18; the operational processing device 18 can execute the image identifying method to determine whether the leaving object or the missing object is within the monitoring image. The monitoring camera 10 and the operational processing device 18 can be connected to each other in a wire manner or in a wireless manner, which depends on actual demand.

Figure 3:
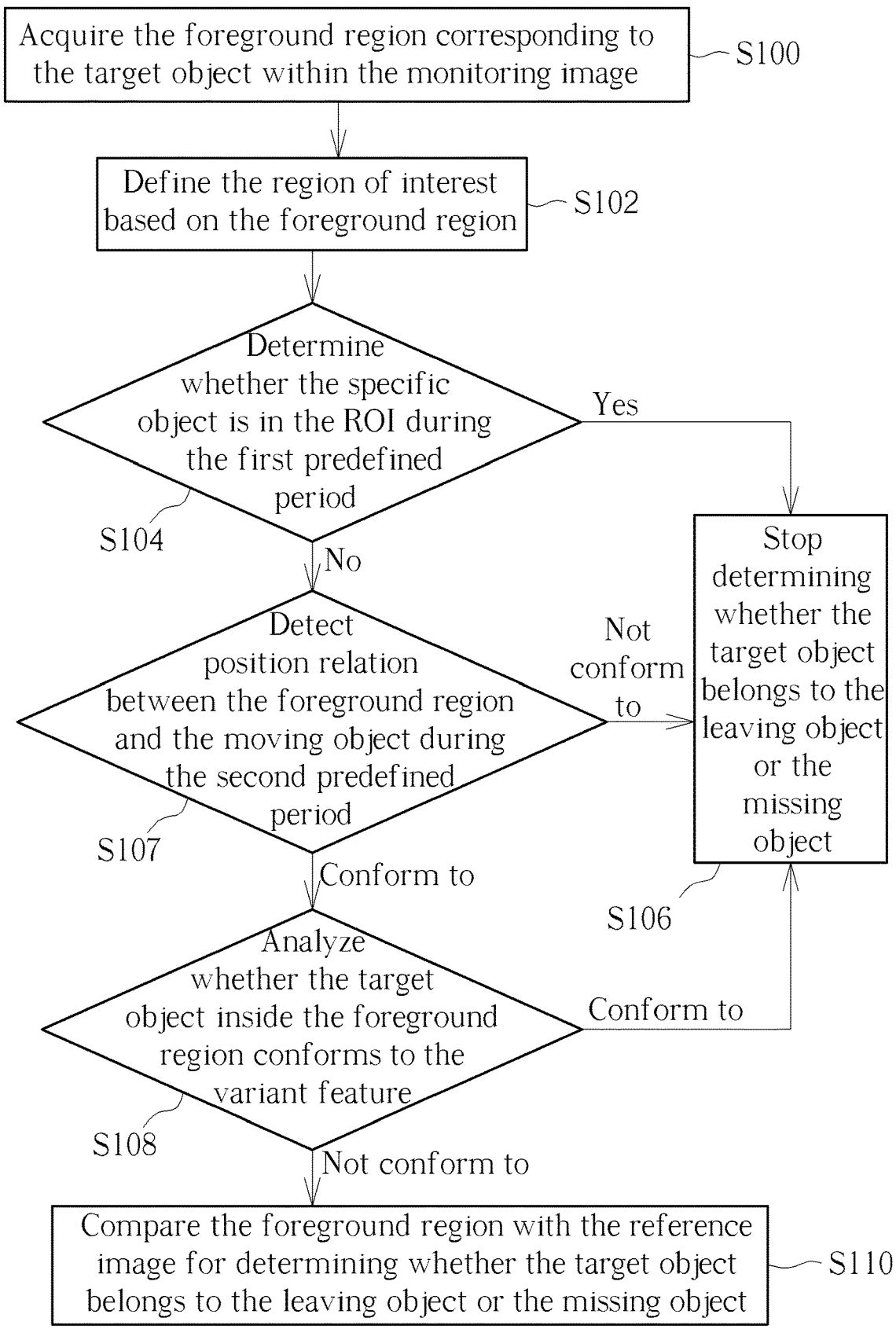
FIG. 3 is a flow chart of the image identifying method according to the embodiment of the present invention.
Figure 4:
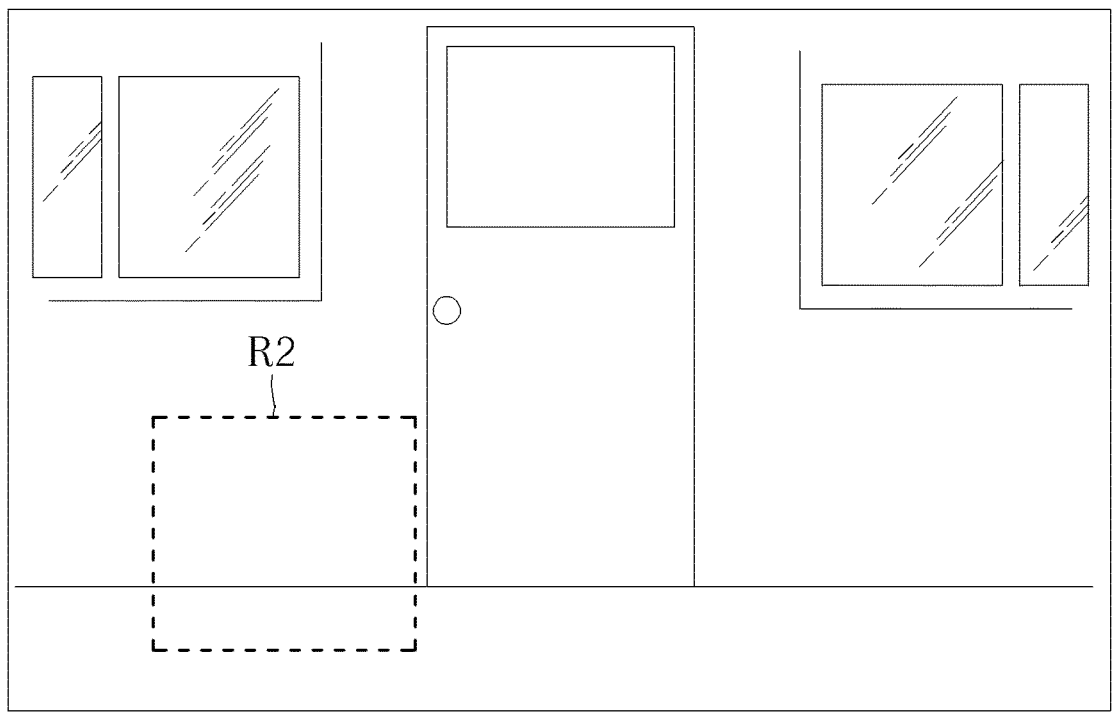
FIG. 4 to FIG. 7 are diagrams of the monitoring image acquired at different points of time according to the embodiment of the present invention.
Figure 5:
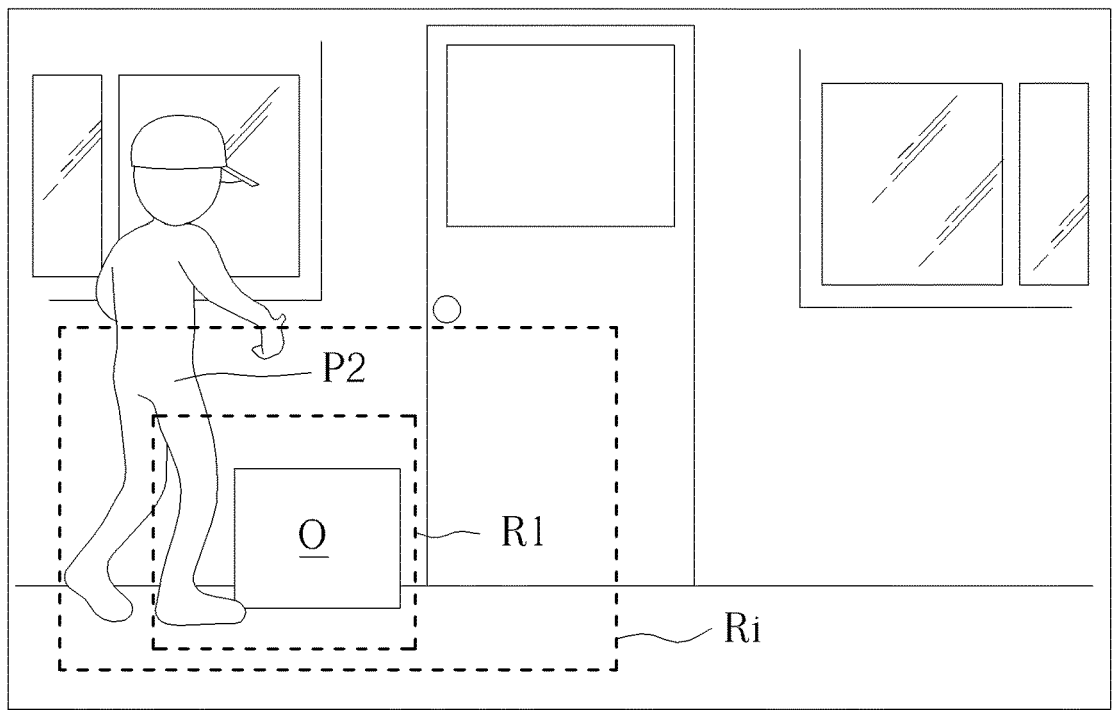
Figure 6:
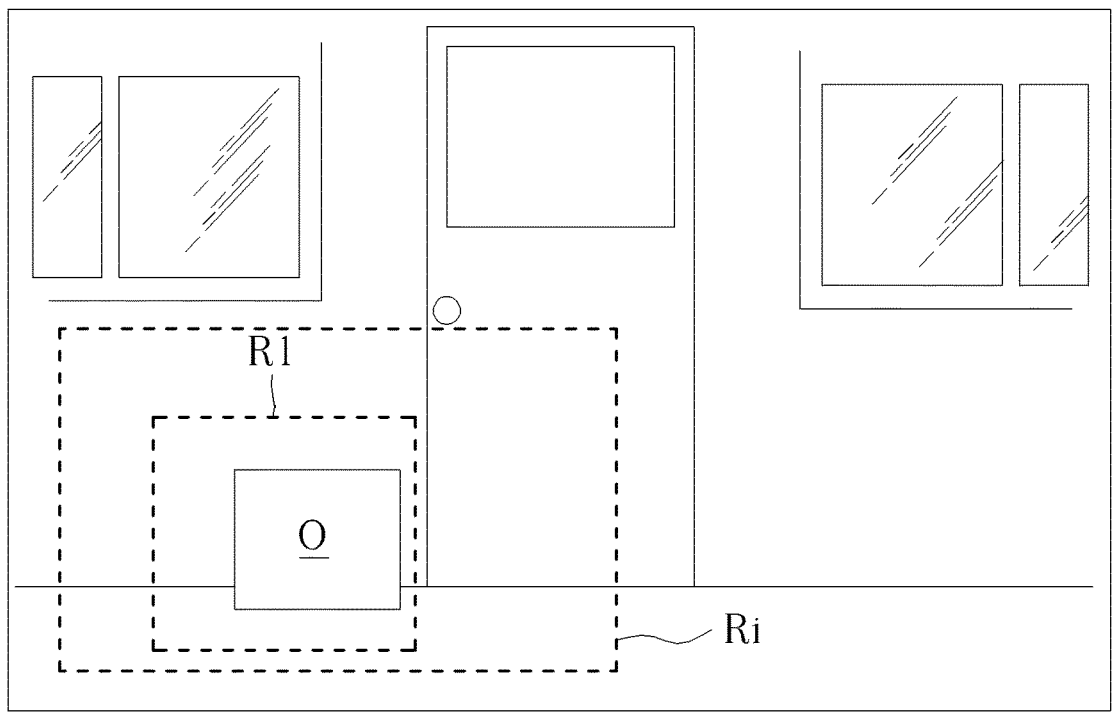
Figure 7:
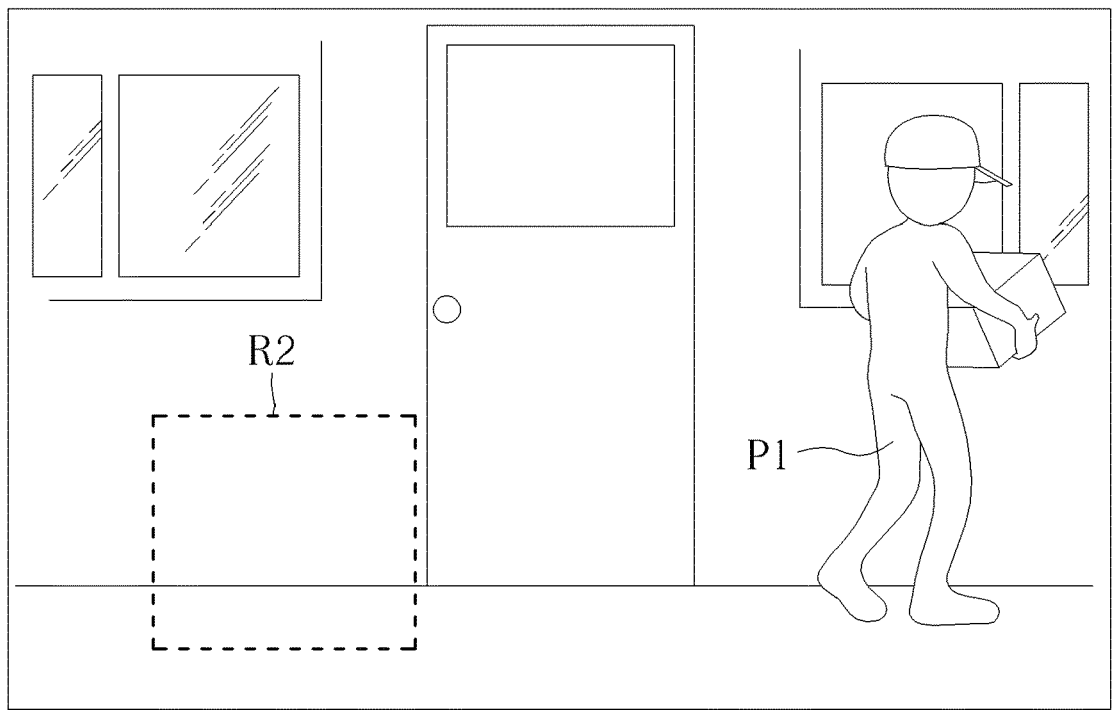

Please refer to FIG. 1 to FIG. 7. FIG. 3 is a flow chart of the image identifying method according to the embodiment of the present invention. FIG. 4 to FIG. 7 are diagrams of the monitoring image acquired at different points of time according to the embodiment of the present invention. In the image identifying method, step S100 is firstably executed to acquire a foreground region R1, which has a position corresponding to the target object O, within a monitoring image I3. Step S100 can compare the monitoring image I3 with a background image I1, and determine a possible range where the target object O may appear via pixel variation between different images. The possible range can be represented as the foreground region R1. Then, steps S102 and S104 are executed to define a region of interest R1 based on the foreground region R1, and to determine whether a specific object P1 is in the region of interest R1 during a first predefined period started at an acquiring point of time about the foreground region R1. The region of interest R1 can be a frame or a circle around the foreground region R1; for example, an interval between boundaries of the foreground region R1 and the region of interest R1 may be ranged from three meter to five meter. The first predefined period may be ranged from five seconds to ten seconds. The specific object P1 inside the monitoring image I4 can be a passerby who is used to determine whether the target object O is at rest.

If the specific object P1 is in the region of interest R1 during the first predefined period, the target object O may not be at rest. The specific object P1 can be a deliveryman who puts down the target object O and is ready to leave, or someone who passes through or is ready to take away the target object O, then step S106 is execute to pause or end step of determining whether the target object O belongs to the leaving object or the missing object. If the specific object P1 is not in the region of interest R1 during the first predefined period, the target object O may be at rest, and step S108 is executed to analyze whether the target object O inside the foreground region R1 conforms to a predetermined variant feature. The image identifying method can utilize the pixel variation between different images to determine whether the target object O is put into a designated area or taken away from the designated area. However, if position of the target object O is accidently or purposely changed, or a shape of the target object O is deformed, or a shadow of the target object O is varied due to ambient illumination, existence of the target object O may be easily misjudged, so that step S108 can be used to obviate conditions of the target object O not belonging to the leaving object and the missing object.

Thus, intensity variation, deformation or a movement of the target object O can be interpreted as the variant feature in step S108. The image identifying method can utilize convolutional neural networks (CNN) classifying technology to determine whether the foreground region R1 conforms to the variant feature; or else, the image identifying method may utilizes feature detection technology to determine whether the target object O inside the foreground region R1 is moved. First, one or more first feature points can be acquired within the foreground region R1, and the background image I1 can be defined as a reference image for searching one or more second feature points, which corresponds to the first feature points, inside a background region R2 of the reference image. Position of the background region R2 can be related to the foreground region R1. If movement differences between each first feature point and a related second feature point are entirely or mostly smaller than a predefined threshold, the movement difference of all feature points can be the same or similar to each other, so that diversity of the foreground region R1 and the background region R2 can represent that the target object O is moved.

Besides, the image identifying method may further compute first histogram distribution information of the foreground region R1 and second histogram distribution information of the background region R2. Then, the image identifying method can set a specific range, which is similar to the first histogram distribution information, inside the second histogram distribution information, and adjust convergence position of the specific range for re-computing its histogram distribution information. If the local histogram distribution information of the specific range is different from the first histogram distribution information, the target object O inside the foreground region R1 is irrelevant to the object inside the background region R2. If the local histogram distribution information is similar to the first histogram distribution information, and/or a dimension of the object inside the foreground region R1 is equal to or similar to a dimension of the object inside the background region R2, difference between the foreground region R1 and the background region R2 can be resulted from the movement or the deformation of the target object O.

Before step S108, step S107 can be optionally executed to detect a position relation between the foreground region R1 and a moving object P2 during a second predefined period back from the acquiring point of time. The second predefined period can be ranged from ten seconds to thirteen seconds earlier than the acquiring point of time. The moving object P2 inside the monitoring image I2 can be the passerby; the specific object P1 and the moving object P2 may represent the same person or two different persons, which depend on actual demand. If the passerby stays around the target object O during the second predefined period, variation in the target object O may be man-made, so that step of determining whether the target object O belongs to the leaving object or the missing object can be executed continuously. Therefore, step S106 can be executed when the position relation does not conform to a predefined condition, and step S108 can be executed when the position relation conforms to the predefined condition.

Figure 8:
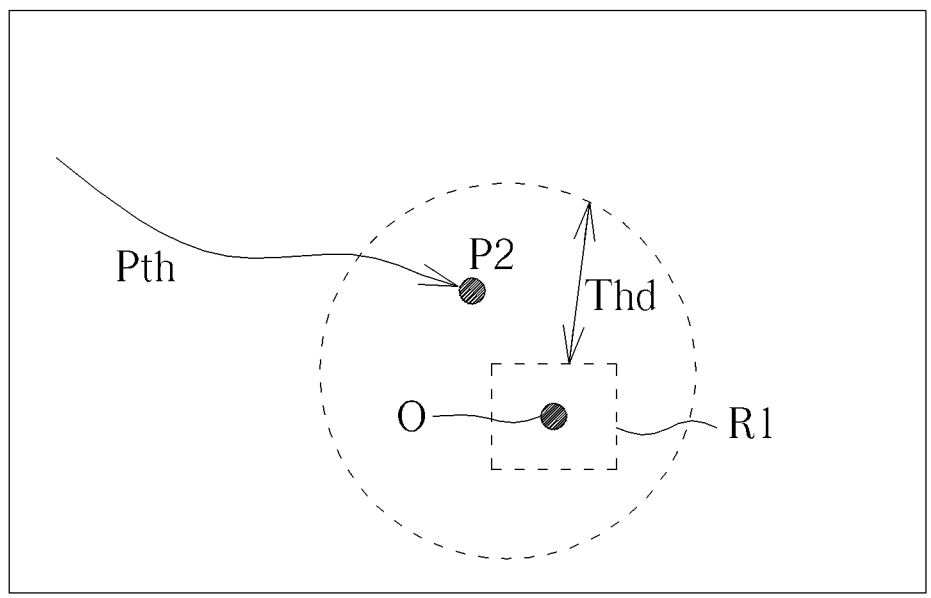
FIG. 8 and FIG. 9 are diagrams of position relation between a foreground region and a moving object drawn in different ways according to the embodiment of the present invention.
Figure 9:
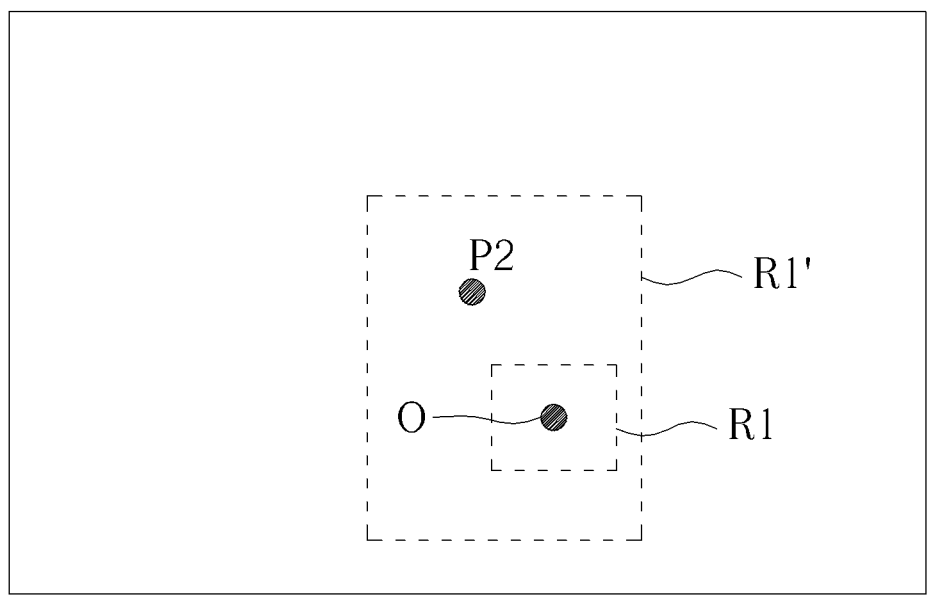

It should be mentioned that the predefined condition may represent the moving object P2 is pretty close to the foreground region R1. Please refer to FIG. 8 and FIG. 9. FIG. 8 and FIG. 9 are diagrams of the position relation between the foreground region R1 and the moving object P2 drawn in different ways according to the embodiment of the present invention. As shown in FIG. 8, the predefined condition can represent that a minimal distance between the foreground region R1 and a moving path Pth of the moving object P2 is smaller than a predefined value Thd. As shown in FIG. 0.9, the image identifying method can mark a rectangular frame around the object; if the moving object P2 is pretty close to the target object O, a marking frame of the foreground region R1 can be enlarged as the rectangular frame R1' drawn by a dotted-line, which means a dimension of the marking frame R1 generated at the acquiring point of time can be smaller than a dimension of the marking frame R1' during the second predefined period.

In step S108, if the target object O inside the foreground region R1 conforms to the variant feature, pixel variation in the foreground region R1 and the background region R2 can just be the intensity variation, the deformation or the movement of the target object O, so that the image identifying method can determine the target object O inside the foreground region R1 does not belong to the leaving object or the missing object, and step S106 is executed accordingly. If the target object O inside the foreground region R1 does not conform to the variant feature, step S110 can be executed to compare the foreground region R1 with the reference image for determining whether the target object O inside the foreground region R1 belongs to the leaving object or the missing object.

As an example of comparing the foreground region R1 of the monitoring image I3 with the background image I1, when the background image I1 is used as the reference image, and the background region R2 does not have the target object O but the foreground region R1 has the target object O, the target object O can belong to the leaving object put by the moving object P2. As an example of comparing the foreground region R1 of the monitoring image I3 with the monitoring image I4, when the monitoring image I4 is used as the reference image, and the foreground region R1 has the target object O but the background region R2 of the monitoring image I4 does not have the target object O, the target object O can belong to the missing object taken away by the specific object P1.

The image identifying method and the related monitoring camera and the monitoring camera system of the present invention can track and record the passerby's path, and firstably obviate conditions of generating error alert due to the intensity variation, the movement or the deformation of the target object when no person approaches. Generally, the condition about the intensity variation can be analyzed and filtered before judgments about the movement and the deformation, which depends on the actual demand. After obviation of the error alert, the image identifying method can determine whether the target object belongs to the leaving object or the missing object, and send out a warning message related to determination about the leaving object or the missing object. For example, the monitoring camera or the monitoring camera system may be installed on an outdoor hallway, and the image identifying system can immediately identify a state of merchandise when the merchandise is delivered or stolen, and send the message to remind the user of the merchandise's condition accordingly.

Thus, the present invention can effectively decrease the amount of data and computation in the image identifying process by excluding the object formed by the variant feature, so as to identify the target object belongs to the leaving object or the missing object rapidly and accurately.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image identifying method of determining whether a target object is a leaving object or a missing object, the image identifying method comprising:
   acquiring a foreground region corresponding to the target object within a monitoring image;
   analyzing whether the target object inside the foreground region conforms to a variant feature, wherein the target object inside the foreground region conforming to the variant feature represents a difference between the foreground region and a reference image is resulted from at least one of a deformed shape and a varied shadow of the target object; and
   comparing the foreground region with the reference image to determine whether the target object inside the foreground region belongs to the leaving object or the missing object when the target object inside the foreground region does not conform to the variant feature.

2. The image identifying method of claim 1, further comprising:
   defining a region of interest based on the foreground region when the foreground region is acquired;
   determining whether a specific object is in the region of interest during a first predefined period started at an acquiring point of time about the foreground region; and
   analyzing whether the target object inside the foreground region conforms to the variant feature when the specific object is not in the region of interest during the first predefined period.

3. The image identifying method of claim 2, wherein when the specific object is in the region of interest during the first predefined period, execution of determining whether the target object belongs to the leaving object or the missing object is paused or ended.

4. The image identifying method of claim 2, further comprising:
   detecting a position relation between the foreground region and a moving object during a second predefined period back from the acquiring point of time; and
   analyzing whether the target object inside the foreground region conforms to the variant feature when the specific object is not in the region of interest during the first predefined period and the position relation conforms to a predefined condition.

5. The image identifying method of claim 4, wherein the predefined condition represents that a minimal distance between the foreground region and a moving path of the moving object is smaller than a predefined value.

6. The image identifying method of claim 4, wherein the predefined condition represents that a dimension of a marking frame of the foreground region at the acquiring point of time is smaller than the dimension of the marking frame during the second predefined period.

7. The image identifying method of claim 1, wherein when the target object inside the foreground region conforms to the variant feature, the target object does not belong to the leaving object or the missing object.

8. The image identifying method of claim 1, wherein the variant feature is intensity variation, deformation or a movement of the target object, and the image identifying method utilizes convolutional neural networks (CNN) classifying technology to determine whether the target object inside the foreground region conforms to the variant feature.

9. The image identifying method of claim 1, wherein the variant feature is a movement of the target object, and the image identifying method further comprises:
   acquiring at least one first feature point of the foreground region;
   searching at least one second feature point corresponding to the at least one first feature point within the reference image; and
   determining the target object inside the foreground region is moved when a movement difference between the at least one first feature point and the at least one second feature point is smaller than a threshold.

10. The image identifying method of claim 1, wherein the variant feature is deformation or a movement of the target object, and the image identifying method further comprises:
    acquiring a background region corresponding to the foreground region within the reference image;
    acquiring first histogram distribution information of the foreground region and second histogram distribution information of the background region; and
    determining the target object inside the foreground region is deformed or moved when the first histogram distribution information is matched with the second histogram distribution information.

11. The image identifying method of claim 10, wherein when the first histogram distribution information is matched with the second histogram distribution information, and the foreground region and the background region have the same or similar dimensions, the image identifying method determines the target object inside the foreground region is deformed or moved.

12. The image identifying method of claim 1, wherein determining the target object inside the foreground region belongs to the leaving object or the missing object comprises:
    acquiring a background region corresponding to the foreground region within the reference image; and
    determining the target object belongs to the leaving object when the background region does not have the target object but the foreground region has the target object.

13. The image identifying method of claim 1, wherein determining the target object inside the foreground region belongs to the leaving object or the missing object comprises:
    acquiring the reference image generated at a point of time later than the monitoring image;
    acquiring a background region corresponding to the foreground region within the reference image; and
    determining the target object belongs to the missing object when the foreground region has the target object and the background region does not have the target object.

14. A monitoring camera comprising:
    an image receiver adapted to receive a monitoring image; and
    an operation processor electrically connected to the image receiver, the operation processor being adapted to acquire a foreground region corresponding to a target object within a monitoring image, analyze whether the target object inside the foreground region conforms to a variant feature, and compare the foreground region with a reference image to determine whether the target object inside the foreground region belongs to a leaving object or a missing object when the target object inside the foreground region does not conform to the variant feature;
    wherein the target object inside the foreground region conforming to the variant feature represents a difference between the foreground region and the reference image is resulted from at least one of a deformed shape and a varied shadow of the target object.

15. The monitoring camera of claim 14, wherein the operation processor is further adapted to define a region of interest based on the foreground region when the foreground region is acquired, determine whether a specific object is in the region of interest during a first predefined period started at an acquiring point of time about the foreground region, and analyze whether the target object inside the foreground region conforms to the variant feature when the specific object is not in the region of interest during the first predefined period.

16. The monitoring camera of claim 14, wherein the variant feature is a movement of the target object, and the operation processor is further adapted to acquire at least one first feature point of the foreground region, search at least one second feature point corresponding to the at least one first feature point within the reference image, and determine the target object inside the foreground region is moved when a movement difference between the at least one first feature point and the at least one second feature point is smaller than a threshold.

17. The monitoring camera of claim 14, wherein the variant feature is deformation or a movement of the target object, and the operation processor is further adapted to acquire a background region corresponding to the foreground region within the reference image, acquire first histogram distribution information of the foreground region and second histogram distribution information of the background region, and determine the target object inside the foreground region is deformed or moved when the first histogram distribution information is matched with the second histogram distribution information.

18. A monitoring camera system comprising:
    at least one monitoring camera adapted to receive a monitoring image; and
    an operational processing device connected to the monitoring camera in a wire manner or a wireless manner, the operational processing device being adapted to acquire a foreground region corresponding to a target object within a monitoring image, analyze whether the target object inside the foreground region conforms to a variant feature and compare the foreground region with a reference image to determine whether the target object inside the foreground region belongs to a leaving object or a missing object when the target object inside the foreground region does not conform to the variant feature;
    wherein the target object inside the foreground region conforming to the variant feature represents a difference between the foreground region and the reference image is resulted from at least one of a deformed shape and a varied shadow of the target object.

19. The monitoring camera system of claim 18, wherein the operation processing device is further adapted to define a region of interest based on the foreground region when the foreground region is acquired, determine whether a specific object is in the region of interest during a first predefined period started at an acquiring point of time about the foreground region, and analyze whether the target object inside the foreground region conforms to the variant feature when the specific object is not in the region of interest during the first predefined period.

20. The monitoring camera system of claim 18, wherein the variant feature is a movement of the target object, and the operation processing device is further adapted to acquire at least one first feature point of the foreground region, search at least one second feature point corresponding to the at least one first feature point within the reference image, and determine the target object inside the foreground region is moved when a movement difference between the at least one first feature point and the at least one second feature point is smaller than a threshold.

* * * * *